March 26, 1968 J. H. GUYTON 3,375,446

COMBINATION RADIO RECEIVER VOLUME AND SQUELCH CONTROL

Filed Sept. 10, 1964

INVENTOR.
James H. Guyton
BY
Robert E. Fowler
ATTORNEY

United States Patent Office 3,375,446
Patented Mar. 26, 1968

3,375,446

COMBINATION RADIO RECEIVER VOLUME AND SQUELCH CONTROL

James H. Guyton, Kokomo, Ind., assignor to General Motors Corporation, Detroit, Mich., a corporation of Delaware Filed Sept. 10, 1964, Ser. No. 395,449
2 Claims. (Cl. 325—399)

ABSTRACT OF THE DISCLOSURE

The construction and interconnection of a switch for radio receivers having a squelch circuit. Switch shaft carries volume control knob and two cam actuators for On-Off switch and squelch circuit switch so squelch is deactivated at maximum volume position.

*Summary of the invention*

This invention relates to radio receiver means and more particularly to means for controlling the operation of a radio receiver.

In the operation of radio receivers used in areas in which the noise level is high or which are adapted to remain on the air for extended periods of time without an incoming carrier, squelch circuits are usually incorporated to prevent the receipt of excessive noise signals in the absence of such carriers. These circuits are a form of gain control and reduce the sensitivity of the amplifier in the absence of carrier waves. Thus noise level in a receiver can be kept down to a low figure as it is tuned over the band or as it remains energized without an incoming carrier wave. Unless a carrier signal of sufficient strength is encountered during tuning, the sensitivity will remain at a low value and no signal will be translated by the speaker. However, there may be occasions when the operator cannot tune in any signals in the band strong enough to overcome the squelch but desires to cut out the same, increase the sensitivity of the receiver and further search for weak stations. This is particularly true in the use of relatively light, portable, short range apparatus such as may be used in the field.

It is an object in making this invention to provide means for controlling several functions of a radio receiver by the use of a single operative member;

It is a further object in making this invention to provide a combination radio control means for On-Off, volume control and squelch control.

With these and other objects in view which will become apparent as the specification proceeds, my invention will be best understood by reference to the following specification and claims and the illustrations in the accompanying drawings, in which:

Figures 1, 2, 3, 4, 5, 6:
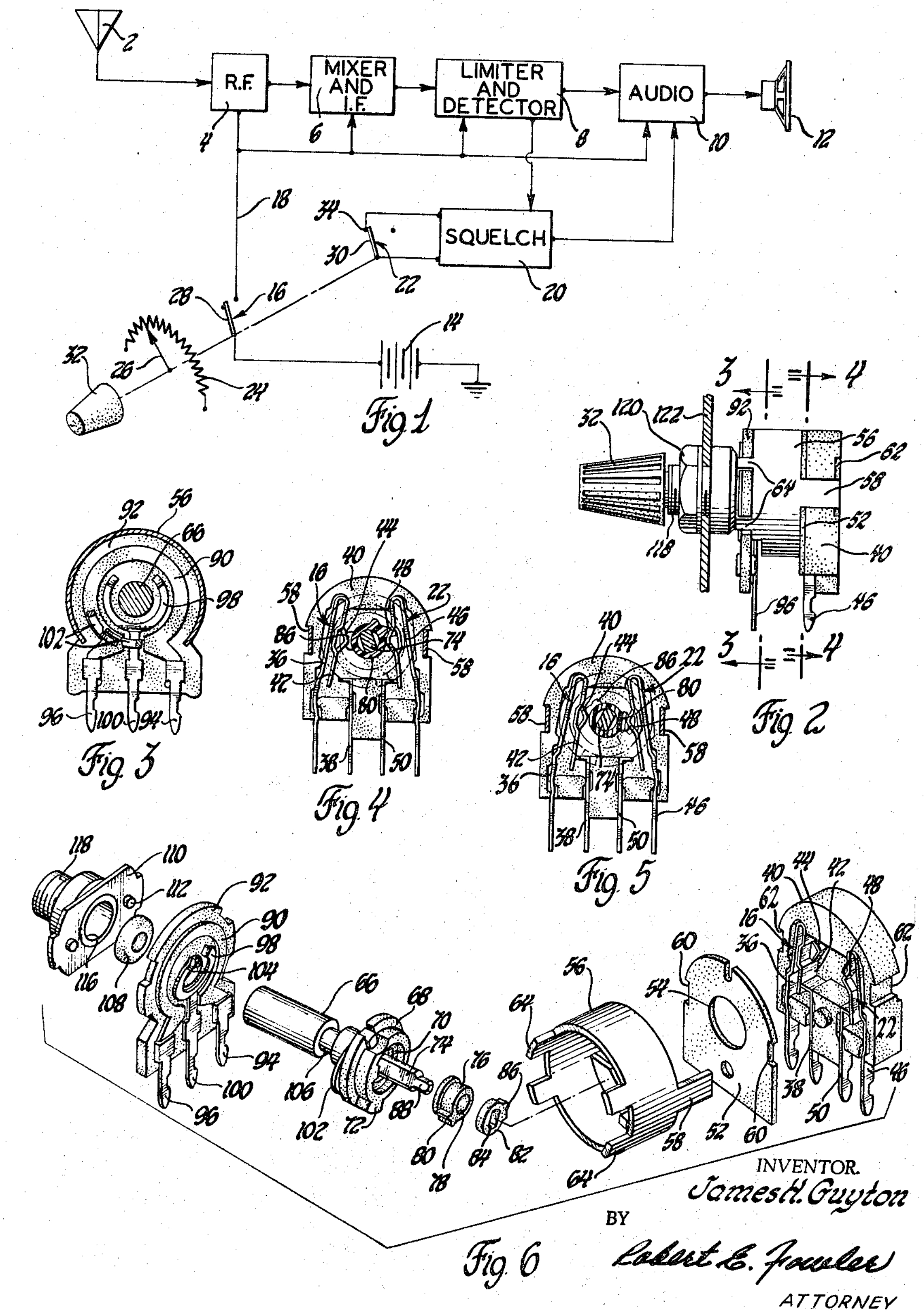
FIGURE 1 is a block diagram of a radio receiver with a schematic showing of the compound control means embodying this invention associated therewith.
FIG. 2 is a side elevational view of the compound control unit.
FIG. 3 is a sectional view taken in the direction of the arrows on line 3—3 of FIG. 2.
FIG. 4 is a sectional view taken in the direction of the arrows on line 4—4 of FIG. 2.
FIG. 5 is a view similar to FIG. 4 with the switch contacts shown in a different position; and, FIG. 6 is an exploded view of the parts of the switch.

Referring now more particularly to the drawings, FIG. 1 illustrates in block diagram form a radio receiver. It includes an antenna 2 connected to an RF amplifier section 4 and thence to a mixer and IF amplifier section 6 to amplify the incoming waves, reduce their frequency by mixing them with locally generated waves to the intermediate frequency and amplify the same. The receiver may be of the FM type and if so, the output of the IF section 6 is fed into a limiter and detector section 8 which then feeds the audio amplifier section 10. The output of the audio amplifier 10 is applied to a loudspeaker 12. This receiver is supplied with power from any suitable source such, for example, as a battery 14, one terminal of which is grounded and the opposite end connected through an On-Off switch 16 to line 18 which is connected to all of the units previously described.

The receiver is also provided with a squelch circuit 20 which is connected to the limiter and detector section 8 and also to the audio amplifier section 10. When the squelch circuit is energized it tends to de-energize the audio and, therefore, prevent a signal from being applied to the loudspeaker 12. In the present system a control switch 22 is provided for the squelch system. When this switch is closed the squelch system is operative in the normal manner. When it is open the squelch circuit is de-energized and is incapable of performing its normal function. The receiver is also provided with a conventional volume control which is schematically shown as a resistance 24 connected into the circuit, over which a movable arm 26 moves to control the volume of the receiver. The movable arm 26, the actuating arm 28 of the On-Off switch 16 and the actuating arm 30 of the squelch switch 22 are all mounted on a common axis and are actuated by a single control knob 32 available to the operator.

In operation there is a certain amount of lost motion between the movements of the actuating arms 28 and 30. Assuming that the receiver is off and that switch 16 is open and the knob 32 rotated to its extreme counterclockwise position, the knob 32 is first rotated a short distance in a clockwise direction. This causes actuation of the toggle switch 16 to close its contacts, energizing the receiver. At this point the maximum amount of resistance is incorporated in the audio system and, therefore, the volume is at its minimum. Continued rotation of the knob 32 and its associated shaft moves the arm 26 over the resistance 24, increasing the volume of output of the receiver. This motion does not cause actuation of the switch 22 and the arm 30 remains in contact with the lefthand stationary post 34 and the squelch system is energized. Continued clockwise rotation of the knob 32 keeps increasing the volume until a maximum point has been reached. At this point, if no carrier wave has been received the last portion of rotation of the knob 32 now actuates switch 22 to open the squelch circuit. The operator can then search for a carrier without the squelch circuit and the squelch circuit will remain de-energized throughout the return of the arm 26 to its minimum position and will not be closed again until that time. Thus, the operator has control of whether or not the squelch circuit is in circuit by merely running the shaft to its extreme clockwise position, actuating toggle switch 22 and then returning to some intermediate volume setting. When the set is turned off the squelch circuit 22 will then again be closed and will be in that position for the next operation of the receiver.

FIGS. 2 through 6 disclose the actual detail of the switch construction for accomplishing this operation and in FIG. 2 the knob 32 is shown on the outer end of the control shaft. The details of the two toggle switches 16 and 22 and the variable resistance volume control 24–26 are best shown in the exploded view, FIG. 6. The On-Off switch 16 is formed by the two conductive arms 36 and 38 carried in the plate 40 of insulating material which is mounted on the rear of the assembly. Arm 38 is stationary. Arm 36 is in the form of a hair pin and the downwardly extending portion 42 has a raised operating cam follower 44 which is adapted to be moved toward and away from the inturned end of stationary arm 38 to make and break electrical contact therewith.

In the other side of the plate 40 there are carried the components forming the squelch switch 22. This is formed by a similar hair pin member 46 which extends upwardly and is then bent back upon itself to form a spring arm and has a raised cam follower portion 48. The end of the spring arm portion is similarly adapted to contact the angular end of a stationary switch member 50 to provide switching action. The cam follower portions 44 and 48 are offset axially and are operated by two separate cams which will be described.

Next in order in the assembly and covering the two switches just described is a panel 52 of insulating material having a central bore 54 therein through which the operating shaft may pass. A central cylinder housing member 56 is provided to fit over the main body of the switch and it has rearwardly extending tangs 58 which when assembled lie in opposite grooves 60 and 62 in the panel and plate, respectively, and are bent over the rear face to hold the switch assembly together. The cylindrical housing 56 also has similar forwardly projecting tangs 64 which secure the components to the left together as will be explained.

A central operating shaft 66 extends from the knob through the switch assembly for operating all components. Upon this central shaft there is rigidly mounted a circular member 68 of insulating material having in one face thereof an annular depression 70 which has one outwardly radially projecting tooth 72. The portion of the shaft projecting through this member 68 is flattened on both sides as shown at 74. Adapted to be mounted within the cavity 70 is an insulated operating cam 76 having a central bore 78 which fits over the maximum diameter of the shaft 66 and my rotate freely thereon. This cam has an outwardly projecting lug 80 which is adapted to rotate the cam 76 when the shaft 66 rotates and tooth 72 engages the lug 80. It also acts as an operating member for the switch 22 when it engages the cam portion 48 of that switch, opening the same at the maximum clockwise rotation of the knob 32.

Assembled on the shaft 66 to the right of cam operator 76 is a second, smaller cam operator 82. This is the member which operates the Off-On switch 16 normally holding it open when the knob 32 is in its extreme counter-clockwise position by permitting it to close and to stay closed at any other point in the rotation of the shaft 66. This cam operator has an elongated flattened opening 84 in the center and is adapted to slip over the flattened end of the shaft at 74. It has a projecting jug or operator 86 which engages the cam follower 44 when in the extreme counter-clockwise position to hold the switch 16 open and the set de-energized. However, as soon as knob 32 is rotated it moves away from engagement with raised cam follower 44 allowing switch 16 to close and it remains closed during all other positions of rotation. The end 88 of the saft 86 is adapted to project through a small aperture in the back of plate 40 which acts as a bearing.

The remaining control item incorporated in this composite assembly is a volume cam control-variable resistance. This is provided by the resistance material 90 which is mounted on the face of an insulating panel 92 in the form of an arc. Terminal connections are made to this member through terminals 94 and 96. A central conductive member 98 is mounted within the resistance arc 90 and it is connected to a single exterior terminal lead 100. It will be obvious that if some means is provided to bridge between the arc 90 and the internal conductor 98 and move in a rotary manner, that more or less resistance will be cut in or out of the circuit to provide the desired result. Such a contact member or arm is provided at 102 on the face of circular insulating member 68 and its configuration is such as to maintain a contact between these two members but to have a relatively small contact with the resistance member 90 and to move around its surface in an arcuate manner to cut in or out resistance.

In the assembly of the switch, the panel 92 has a central opening 104 therein which fits over the shaft 66 to a point beyond the depressed annular groove 106 and is held in juxtaposition to the member 68 by a rubber grommet 108 which is snapped on to the shaft in assembly. The last member to be fitted over the shaft is a threaded bearing member 110 having a pair of pin locating members 112 fitting into mating openings on the front face of insulating panel 92. The center bore 116 acts as a bearing for shaft 66 which projects therethrough upon the exterior end of which the operating knob 32 is secured. This member also has a threaded section 118 adapted to receive a securing nut, such as shown at 120 for mounting the switch assembly on a panel 122.

As shown in FIG. 4 with the knob 32 in its extreme counter-clockwise position, the cam 86 forces the cam follower 44 outwardly holding the switch members 16 apart and the set is off. At this time the tongue 72 has forced the cam 80 away from cam follower 48 so that switch 22 is closed and the squelch circuit energizable. Also at this time the movable resistance arm 102 engages resistance member 90 to include a maximum amount of resistance so that the volume is at its lowest point. Upon initial rotation of the knob 32 clockwise, cam 86 immediately moves away from engagement with cam follower 44 allowing switch 16 to close and to energize the set. At this time since shaft 66 may rotate with respect to cam follower 76, cam actuator 80 will remain where it is and the shaft 66 may continue to rotate permitting more resisance to be moved from the circuit until cam follower 80 is engaged by tooth 72 at the extreme clockwise rotation and at that time with the maximum amount of resistance out of the circuit the switch 22 is actuated and the squelch cut out as shown in FIG. 5. Upon a return in the counter-clockwise direction, however, again shaft 66 may rotate with respect to cam follower 76 and switch 22 remains open until the tooth 72 again contacts the cam 76 to move the cam actuator 80 out of engagement with the cam follower 48 permitting switch 22 to close. This occurs at the same time that cam 86 engages the cam follower 44 to open switch 16 shutting the set off.

It will be obvious that through this simple operation of the receiver the operator may either have his set with squelch or cut the same out very simply through the use of a single control.

What is claimed is:

1. In radio receiving apparatus having radio frequency amplifying, detecting and audio frequency amplifying means, a loudspeaker connected to the audio amplifying means to convert electrical oscillations into sound, squelch means connected to the audio amplifying means and to the radio frequency and detecting means to reduce the output of the audio frequency amplifying means in the absence of a carrier of sufficient strength; a first switch for selectively disabling the squelch means, a source of electrical power, a second switch interconnecting said source of electrical power and the receiving apparatus, control means manually displaceable over a predetermined range, first actuator means interconnecting the control means and the second switch to close the second switch at one end of the said predetermined range, and second actuator means interconnecting the control means and the first switch to open the first switch at the other end of said predetermined range, said second actuator means being operable to close the first switch only when the control means is returned at least substantially from said other end of the range to said one end.

2. In a radio receiver having an On-Off switch and variable resistance volume control, a squelch control circuit connected thereto for reducing the output of the receiver in the absence of an incoming signal, a second switch connected to said squelch control circuit to determine whether or not it is energized, a common control shaft having two switch actuating cams, one fixed and one rotatably mounted thereon, the first mounted adjacent the On-Off switch to actuate the same, a fixed projection on the shaft engageable with the freely rotatable cam to drive the same, said freely rotatable cam being mounted adjacent said second switch for the squelch control circuit, a fixed arm on said shaft movable over the variable resistance volume control as the shaft rotates so that upon initial movement of the shaft in one direction, the On-Off switch will be actuated to energize the receiver, continued rotation will change the amount of resistance in circuit and the volume but the squelch circuit will not be cut out until the shaft has reached the other extreme position when the second switch is actuated to open and remains open as the shaft is reversed to return to low volume and Off position before it is again closed.

References Cited

UNITED STATES PATENTS

| | | | |
|---|---|---|---|
| 2,794,103 | 5/1957 | Moore et al. | 200—6 |
| 2,855,490 | 10/1958 | Arisman et al. | 338—172 |

WILLIAM C. COOPER, *Primary Examiner.*

KATHLEEN H. CLAFFY, *Examiner.*

R. LINN, *Assistant Examiner.*